(12) United States Patent
Cornelissen et al.

(10) Patent No.: US 6,329,968 B1
(45) Date of Patent: Dec. 11, 2001

(54) DISPLAY DEVICE

(75) Inventors: Hugo J. Cornelissen; Dirk J. Broer, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/179,287

(22) Filed: Oct. 27, 1998

(30) Foreign Application Priority Data

Oct. 28, 1997 (EP) .................................................. 97203348

(51) Int. Cl.[7] .......................................................... G09G 3/36
(52) U.S. Cl. ............................................... 345/87; 345/102
(58) Field of Search ................................. 345/87, 89, 90, 345/102

(56) References Cited

U.S. PATENT DOCUMENTS

| | | | |
|---|---|---|---|
| 5,477,239 | * 12/1995 | Bush et al. | 345/102 |
| 5,608,550 | * 3/1997 | Epstein et al. | 359/40 |
| 5,659,410 | * 8/1997 | Koike et al. | 349/82 |
| 5,719,649 | * 2/1998 | Hono et al. | 349/65 |
| 6,020,944 | * 2/2000 | Hoshi | 349/65 |

FOREIGN PATENT DOCUMENTS

| | | |
|---|---|---|
| 0778484A2 | 6/1997 | (EP) . |
| 9708582A1 | 3/1997 | (WO) . |

OTHER PUBLICATIONS

"Compact Front Lighting For Reflective Displays", By C.Y. Tai, Society for Information Display, Digest of Applications Papers, vol. XXVII, May 1996, pp. 43–46.

"Compact Front Lighting For Reflective Displays", by C.Y. Tai, Clio Technologies, Inc., Holland OH. SID 96 Applications Digest, pp. 43–46.

* cited by examiner

Primary Examiner—Richard Hjerpe
Assistant Examiner—Duc Q. Dinh

(57) ABSTRACT

Transflective display device provided with a waveguide which separates light entering from the side or from above into two mutually perpendicular directions of polarization. Polarization separation is obtained at the interface between materials of the waveguide having the same refractive index for one polarization direction and different refractive indices for the other polarization direction.

10 Claims, 1 Drawing Sheet

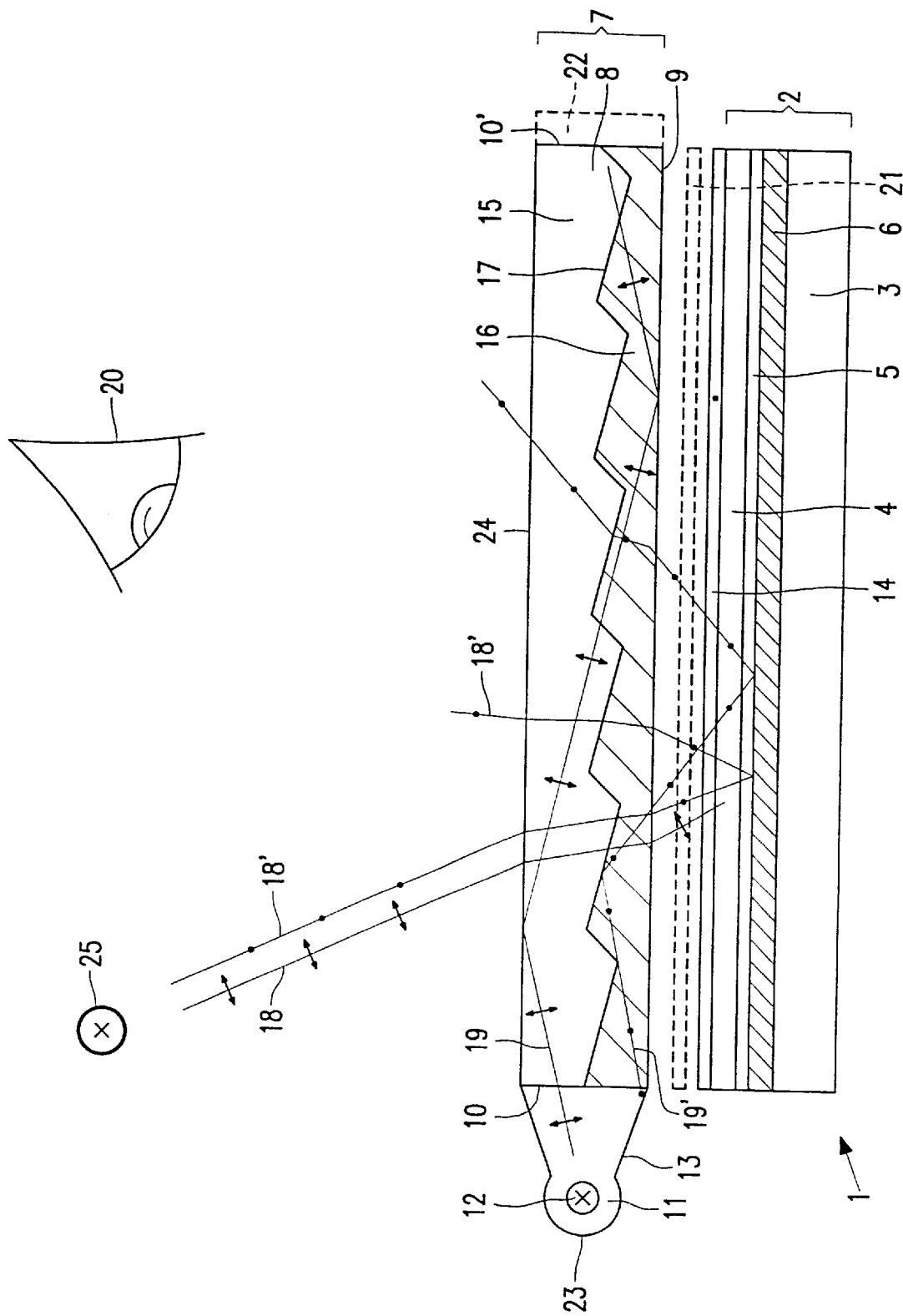

DISPLAY DEVICE

BACKGROUND OF THE INVENTION

The invention relates to a display device comprising a display panel with a first substrate provided with electrodes at the location of pixels, a second light-transmitting substrate and liquid-crystalline material between the two substrates, an illumination system which is situated on the side of the second substrate facing away from the liquid-crystalline material and which includes a light guide of an optically transparent material having an exit surface facing the display panel and a number of end faces, an entrance face for light being situated opposite at least one of said end faces, whereby the light can be coupled in at that end face of the light guide.

Such reflective display devices are used, for example, in portable equipment such as laptop computers, mobile telephones, personal organizers etc. With a view to saving energy, it is desirable that the light source can be turned off when there is sufficient ambient light.

A display device of the above-mentioned type is described in "Compact Front Lighting for Reflective Displays", SID 96 Applications Digest, pp. 43–46. In said document a description is given of a light guide to which an optical compensator is added to preclude image distortion due to a groove structure (microprisms) on the viewer's side of the light guide. Image distortion can be attributed to the fact that the groove structure has different slopes, which results in multiple images. The groove structure is necessary to deflect light rays in the direction of the display panel. In said publication, multiple images are precluded by providing an optical compensator having a complementary groove structure.

In order to function properly, the air gap between both component parts (the light guide and the optical compensator) must have a small accurately defined thickness (obtained, for example, by means of spacers) throughout the plane. This requires a very accurate mounting step, while each local variation in thickness of the air gap gives rise to variation in optical behavior and image distortion.

SUMMARY OF THE INVENTION

It is an object of the invention to provide, inter alia, a solution to the above problem.

To achieve this, a display device in accordance with the invention is characterized in that a polarizer is situated between the light guide and the display panel, and the light guide comprises polarizing means for polarizing the incoming light.

The polarizer may be integrated in the display device.

The function of the polarizing means is, on the one hand, similar to that of the groove structure in the known device, i.e. deflecting light rays originating from the light source in the direction of the display panel, while, on the other hand, only polarized light is passed at the exit surface. The polarized light is subsequently passed by the polarizer (in this case the directions of polarization of the polarizing means and the polarizer are presumed to be identical). For this purpose, the polarizing means are preferably situated at the location of an exit surface of the light guide.

Reflected light which is passed by the polarizer is also passed, in the direction of the viewer, by the polarizing means and the other part of the light guide. As the polarizing means are integrated in the light guide, the above-mentioned mounting step can be dispensed with (and variation in optical behavior no longer occurs).

Light beams incident from the viewer's side, which are incident at an angle (with the normal) which is smaller than the critical angle at the light guide-air interface, are coupled out irrespective of their direction of polarization. The polarizer passes light of the proper polarization, which light is subsequently reflected by the reflective electrodes of the display panel and passed again by the polarizer and the light guide.

As a result of polarization, an unpolarized beam originating from the light source is separated into two mutually perpendicularly polarized beam components. Such a polarization separation is obtained, for example, by making the unpolarized beam impinge on an interface between a region with isotropic material of refractive index n and a region with anisotropic material of refractive indices $n_o$ and $n_e$, where one of the two indices $n_o$ or $n_e$ is equal or substantially equal to $n_p$. If an unpolarized beam is incident on such an interface, the beam component which does not experience a difference in refractive index at the transition between isotropic and anisotropic material, is passed undeflected, whereas the other beam component is deflected or reflected.

If $n_p$ is equal or substantially equal to $n_o$, the ordinary beam is passed undeflected by an interface between isotropic material and anisotropic material, and if $n_p$ is equal or substantially equal to $n_e$, such an interface passes the extraordinary beam undeflected.

Deflected beam components incident on the light guide-air interface at an angle smaller than the critical angle are coupled out again and the polarizer again passes light of the proper polarization, which is subsequently reflected by the reflective electrodes of the display panel.

Preferably, the direction of polarization of the polarizing means is the same as that of the polarizer. In that case, in display panels based, for example, on (twisted) nematic liquid-crystal effects and ferro-electric effects no light is lost. If the directions of polarization of the polarizing means and the polarizer are different, light loss can be precluded by using a phase plate.

The above-mentioned polarisation-separation can be achieved in various ways.

A first embodiment of the invention is characterized in that the light guide is provided with a layer, for example a coating, of a material which differs from that of the other part of the light guide, and in that the polarizing means are formed by a profiled interface between the layer and the other part of the light guide, the material of the other part of the light guide or of the layer being optically anisotropic, while the other material is optically isotropic.

A second embodiment is characterized in that the light guide is provided with a number of recesses comprising a material which differs from that of the other part of the light guide, and in that the polarizing means are formed by interfaces between the recesses and the other part of the light guide, the material of the other part of the light guide or the material in the recesses being optically anisotropic, while the other material is optically isotropic.

Such a light guide is known per se from WO 97/08582 (PHN 15.415).

In said document, light rays incident on the light guide-air interface at a surface situated opposite the exit surface of the light guide at an angle smaller than the critical angle are prevented from being coupled out by furnishing said surface with a reflector. However, such a reflector cannot be used in an illumination system for reflective panels.

To preclude such coupling-out of light rays, a further preferred embodiment of a display device in accordance with the invention is characterized in that coupling-in means are situated between a light source and the light guide, which means limit the angle between a coupled-in light ray and a plane of the light guide parallel to the exit face to maximally 15 degrees.

Preferably, for the optically isotropic part of the light guide, $n_p$ is equal or substantially equal to $n_o$.

For polymers applicable in such a light guide it generally applies that $n_e$ is relatively high, and the above-mentioned choice can be realized more readily than $n_p$ being equal or substantially equal to $n_e$. For the optically anisotropic material, preferably, an anisotropic polymer gel or an anisotropic polymeric network is selected.

These materials can very suitably be used as a birefringent material for applying the coating or filling the recesses, requiring only small quantities.

BRIEF DESCRIPTION OF THE DRAWINGS

These and other aspects of the invention will be apparent from and elucidated with reference to the embodiments described hereinafter.

In the drawings:

FIG. 1 is a sectional view of an embodiment of a reflective display device in accordance with the invention.

DESCRIPTION OF THE PREFERRED EMBODIMENTS

A display device 1 schematically shown in FIG. 1, comprises a display panel 2 and an illumination system 7.

The display panel 2 comprises, between two substrates 3, 4, a liquid-crystalline material 5 the action of which is based on the twisted nematic (TN), super-twisted nematic (STN) or ferro-electric effect to modulate the direction of polarization of light incident thereon. The display panel includes, for example, a matrix of pixels for which light-reflecting picture electrodes 6 are arranged on the substrate 3. The substrate 4 is light-transmitting. For the sake of simplicity, it is assumed that in FIG. 1 only one picture electrode 6 is shown. The display panel further comprises a polarizer 14.

The illumination system 7 comprises a light guide 8 which is made of an optically transparent material and includes four end faces 10, 10'. Opposite one of said end faces, for example 10, there is arranged a light source 12 whose light is coupled into the light guide 8 via the end face 10. Said light source 12 may be, for example, a rod-shaped fluorescent lamp. The light source may also be formed by, for example, one or more light-emitting diodes (LED), particularly in flat display devices with small display panels, such as a mobile telephone The light source 12 may additionally be detachable.

The exit surface 9 of the light guide 8 faces the display panel 2.

To ensure that the light originating from the illumination system 7 is polarized light, in this example, the light guide 8 is divided into two parts made of a different material, which are separated from each other by a saw tooth profile, one of the materials (15) being isotropic and the other material (16) being anisotropic.

Polarization separation occurs at the interfaces between isotropic and anisotropic material. Also recesses filled with different materials can be provided in a surface of the light guide, which may be the exit surface 9 as well as the opposite surface 24. For other variants of the light guide, as well as for the materials used therein, reference is made to the above-cited patent application WO 97/08582.

Each end face 10' of the transparent plate, where no light is coupled in, can be provided with a reflector 22. In this manner, it is precluded that light which was not coupled out at the exit surface 9 and hence propagates through the light guide and arrives at an end face, leaves the light guide 11 via the end face 10'.

Polarization separation takes place at the interfaces 17 between isotropic and anisotropic material. If an unpolarized light beam originating from the light source 12 is incident on such an interface, this beam will be separated into two beam components 19, 19' having mutually perpendicular directions of polarization. (For clarity, the beam shown in FIG. 1 is already separated into these components when it leaves the light source.) To ensure that polarization separation takes place, it must hold for the isotropic material having refractive index $n_p$ and for the anisotropic material having refractive indices $n_o$ and $n_e$, that one of the indices $n_o$ or $n_e$ is equal or substantially equal to $n_p$. In this example, the beam component 19', whose direction of polarization extends transversely to the plane of the drawing, propagates towards the interface 17, where it is refracted in the direction of the exit surface 9 and, if it is incident at an angle above the critical angle, it will be reflected there so as to achieve total internal reflection. If the angle of incidence is smaller than said critical angle, the component will leave the light guide 8. The beam component 19 whose direction of polarization lies in the plane of the drawing propagates, in this example, towards the interface 24 and, if it is incident at an angle above the critical angle, it will be reflected there so as to achieve total internal reflection. If the angle of incidence is smaller than the critical angle, the component will leave the light guide 8. In the case of internal reflection at the exit surfaces 9, 24, the beam component 19 is reflected and will propagate through the light guide 8, which may result in said beam component being depolarized. The depolarized beam component will eventually reach an interface 17 and, subsequently, be polarized as described hereinabove. It is alternatively possible that this component or a part thereof reaches the end face 10 where it is depolarized, so that, upon reaching the interface 17, the portion having the desired direction of polarization will be selected. In general, some degree of birefringence occurs in the light guide, as a result of which the direction of polarization of the beam components 19, 19' undergoes a change. As a result, light is coupled out which would otherwise remain trapped in the guide as a result of internal reflection.

To preclude that light leaves the light guide 8 without contributing to the light output of the illumination system, light of the lamp 12 is preferably coupled into the light guide 8 via coupling-in means 13, for example by means of a wedge-shaped light guide which limits the angle of the in going beam relative to the exit surfaces 9, 24 to 15 degrees. Moreover, as stray light does not occur, this results in an increased contrast.

After reflection in the display panel 2, the beam 19' is propagated through the light guide (refraction as a result of different refractive indices is presumed to be negligible for this example) and reaches the viewer 20.

If there is sufficient ambient light, for example light originating from a lamp 25 or another external light source, an incident beam is separated into two beam components 18, 18' having mutually perpendicular directions of polarization (for clarity, the beam shown in FIG. 1 is already separated into these components when it leaves the light source). As one of the two refractive indices of the layer 16 is greater than that of the part 15 of the light guide 7, in this example, the beam component 18', whose direction of polarization extends transversely to the plane of the drawing, is refracted towards the normal, while the other beam component propagates substantially unrefracted. As these beam components generally make a smaller angle with the normal than the beam 19, 19', both beam components propagate as far as the display panel 2. The beam component 18 whose direction of polarization extends in the plane of the drawing, is absorbed by the polarizer 14, while the beam component 18' whose direction of polarization extends transversely to the plane of the drawing is passed. Subsequently, after reflection in the display panel 2, the beam component 18' is propagated through the light guide (refraction as a result of different refractive indices is again presumed to be negligible) and reaches the viewer 20.

By virtue thereof, the display device can very suitably be used with (beam 19, 19') and without (beam 18, 18') the lamp 12 (side-light).

In the foregoing, it is assumed that the direction of polarization of the polarizing means (and hence of the beams 18', 19') is the same as that of the polarizer 14. In practice, however, this is not always the case, for example, because the direction of polarization of the polarizer 14 is chosen to be parallel to the direction of orientation of the liquid-crystal molecules. To preclude loss of light, a phase plate 21, indicated by interrupted lines, is shown in FIG. 1, which rotates the polarization axis in such a manner that this loss is (substantially) prevented.

As described hereinabove, various variants of light guides are possible, for example those described, inter alia, in WO 97/08582. For example, the polarizing means may alternatively be situated at the exit surface 24. It is also possible to employ the sawtooth of FIG. 1 with a variable pitch which, for example, decreases as the distance to the lamp 12 is larger.

The picture electrodes 6 do not have to be light reflecting. In an alternative embodiment, these picture electrodes are used as light-transmitting ITO electrodes, and a mirror is situated behind these electrodes.

In summary, the invention relates to a display device comprising a front-light illumination system furnished with a light guide, which can be switched off in the case of ambient light. The light guide is based on polarization separation at the interface between two materials having different refractive indices, whereby for one beam component the refractive index in both materials is the same, while for the other beam component the refractive indices are different.

What is claimed is:

1. A display device comprising:
    a display panel with a first substrate having light-reflecting electrodes at pixel locations thereon, a second light-transmitting substrate, and liquid-crystalline material between the two substrates;
    an illumination system situated on the side of the second substrate facing away from the liquid-crystalline material, said illumination system including a light guide of optically transparent material having an exit surface facing the display panel and a plurality of end faces, an entrance face for incoming light being situated at least at one of said end faces, whereby the incoming light can be coupled in at said entrance face;
    a polarizer situated between the light guide and the display panel; and
    polarizing means comprised in the light guide for polarizing the incoming light.

2. A display device as claimed in claim 1, wherein the polarizing means are situated at an exit surface of the light guide.

3. A display device as claimed in claim 1, wherein the direction of polarization of light exiting the light guide via the polarizing means is the same as the direction of polarization of said polarizer.

4. A display device as claimed in claim 2, further comprising coupling-in means situated between a light source and the light guide for limiting the angle between a coupled-in light ray and the plane of the light guide parallel to the exit surface thereof to maximally 15 degrees.

5. A display device as claimed in claim 1, wherein polarization of a beam of incoming light takes place at the interface between two materials having different refractive indices, such that for one beam component the refractive index in both materials is the same, while for the other beam component the refractive index is different in both materials.

6. A display device as claimed in claim 5, wherein the light guide includes a layer of a material which differs from that of the remainder of the light guide, the polarizing means are formed by a profiled interface between said layer and the remainder of the light guide, and the material of either of said layer and the remainder of the light guide is optically anisotropic while the other is optically isotropic.

7. A display device as claimed in claim 1, wherein the light guide has a number of recesses having therein a material which differs from that of the remainder of the light guide, the polarizing means are formed by interfaces between the recesses and the remainder of the light guide, and the material of either of said remainder and said recesses is optically anisotropic while the other is optically isotropic.

8. A display device as claimed in claim 6, wherein interface between said layer and the remainder of the light guide is in the shape of a sawtooth profile.

9. A display device as claimed in claim 1, wherein a phase plate is situated between the light guide and the display panel.

10. A display device as claimed in claim 1, further comprising a light source on the side of the entrance face for supplying the incoming light.

\* \* \* \* \*